Figure 1A:
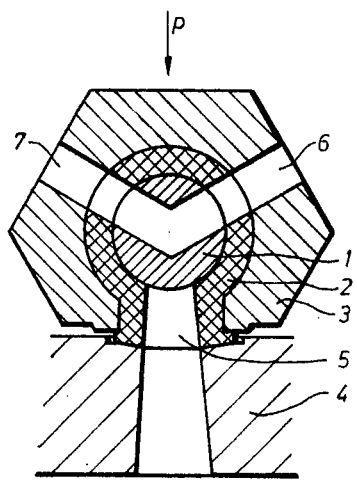

United States Patent

[11] 3,598,139

[72] Inventors Heinrich Boden
Opladen;
Ulrich Knipp, Leverkusen, both of,
Germany
[21] Appl. No. 799,291
[22] Filed Feb. 14, 1969
[45] Patented Aug. 10, 1971
[73] Assignee Farbenfabriken Bayer Aktiengesellschaft
Leverkusen, Germany
[32] Priority Feb. 23, 1968
[33] Germany
[31] P 16 75 503.6

[54] MOLD-CLOSURE COCK FOR MACHINES FOR THE PROCESSING OF HIGHLY REACTIVE MULTICOMPONENT SYSTEMS
10 Claims, 2 Drawing Figs.
[52] U.S. Cl. ............................................. 137/240,
18/30, 137/625.42, 251/314
[51] Int. Cl. ................................................ F16k 51/00
[50] Field of Search .......................................... 137/240,
239, 238, 237, 625.41, 625.42, 625.47; 251/310,
317; 251/310, 317, 314, 316; 18/30

[56] References Cited
UNITED STATES PATENTS

| | | | |
|---|---|---|---|
| 2,856,952 | 10/1958 | Stillwagon | 251/317 X |
| 2,318,638 | 5/1943 | Scott | 137/240 |
| 3,050,082 | 8/1962 | Bass | 251/317 X |
| 3,073,336 | 1/1963 | Johnson | 251/317 X |
| 3,157,195 | 11/1964 | McIntosh | 251/317 X |

FOREIGN PATENTS

| | | | |
|---|---|---|---|
| 692,647 | 10/1930 | France | 137/625.47 |

Primary Examiner—Clarence R. Gordon
Attorney—Burgess, Dinklage & Sprung

ABSTRACT: In a mold-closure cock for assembly for machines for processing reactive multicomponent systems, e.g. for foamed plastics, an elastic bushing is provided between the cock body and cock plug which is elastically deformable by application of pressure on the cock body against a mold sprue to facilitate removal of residual reacted plastic particles.

PATENTED AUG 10 1971 3,598,139

INVENTORS:
Heinrich Boden, Ulrich Knipp.
BY
Burgess, Dinklage & Sprung

MOLD-CLOSURE COCK FOR MACHINES FOR THE PROCESSING OF HIGHLY REACTIVE MULTICOMPONENT SYSTEMS

The invention relates to a mold-closure cock for machines for the processing of highly reactive multicomponent systems. With such systems, the problem exists of introducing the highly reactive synthetic plastics material system into a mold cavity, in certain circumstances under pressure, and to close the mold extremely quickly with the smallest possible loss of material. It is at the same time necessary to clean the mixing assembly from residues of the highly reactive synthetic plastics system, since otherwise the danger exists of the plastics material hardening in the mixing and inlet system and thereby leading to clogging effects. This problem has hitherto been solved very incompletely by various means. By way of example, the mixing assembly has been held directly on the filling aperture of the mold cavity, then quickly swung to one side and the opening closed by a plug which is to be knocked in. It is obvious that in this case there is a considerable loss of material because of the reaction mixture running out of the mold. Furthermore, it is possible to interpose nonreturn valves, for example ball valves, between the mixing assembly and mold cavity. However, they have the disadvantage that, as previously described, the highly reactive mixture of the plastics material remaining in the valve becomes hard and thus a valve can only be used for one operation and thereafter has to be cleaned. Another possibility consists in arranging a coupling element between the mixing assembly and mold sprue, said element including a gate-type slide valve. By this means, exact proportioning is possible. Loss of material due to the highly reactive synthetic plastic system running out of the mold does not arise, but the synthetic plastics polymerise on the mold side between the sprue and slide valve and on the measuring side between the connecting coupling and slide valve, so that after each measuring or proportioning operation, the coupling component including the slide valve has to be cleaned mechanically. The procedure has also been adopted of introducing normal three-way cocks. This has the advantage that an exact proportioning of the mixture of initial materials entering the mold is assured without any subsequent running out. Unfortunately, however, it is impossible to clean a normal three-way cock plug in the flushing position, since one bore in which reacting plastics mixture is still disposed is unaffected by the flushing medium. To be considered as an additional disadvantage of any normal three-way cock is the coupling on the mold side, which is of very unfavorable design for cleaning purposes and which means that the three-way cock at least must be unscrewed after each measuring operation, and the remaining product, which has meanwhile reacted to form a synthetic plastics material, has to be removed mechanically.

Because of the previously described disadvantages, it is unfortunately impossible to fill existing mold cavities by a rational "batch" method, such as is quite usual, for example, in injection-molding methods. The disadvantages described herein are obviated by the apparatus according to the invention.

According to the invention, highly reactive multicomponent systems can be economically processed by using a mold-closure cock which, in the operative position, provides a connection between the feeder of the mixing assembly and the mold sprue and in the flushing position provides a connection between the feeder of the mixing assembly and the cleaning outlet opening and which in this position seals off the mold. The cock plug is rotatably mounted in an elastic bushing, disposed between the cock body and the cock plug. The outlet opening of the elastic bushing is enlarged conically towards the mold sprue and optionally is elastically deformed by the bearing pressure on the cock body.

Figure 1B:
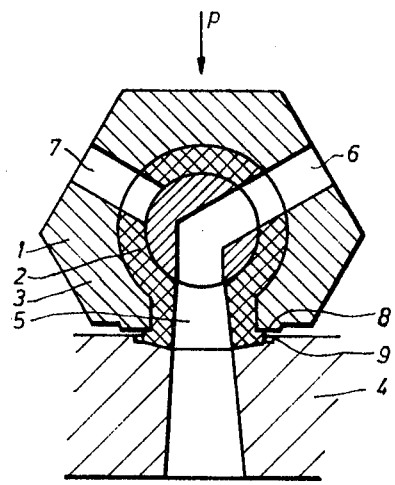

One embodiment of the mold-closure cock is shown by way of example in the drawing. FIGS. 1a and 1b show such a mold-closure cock in the flushing position (FIG. 1a) and operative position (FIG. 1b).

The cock plug 1 is rotatably mounted in the cock body 3 in the elastic bushing 2, which also contains the outlet opening 5 formed towards the mold sprue 4. The mixing assembly (not shown) is connected via the mixing head feeder 6 fast to the cock. In the direction indicated by the arrow, the mold body is forced against the mold sprue 4 in the operating and flushing position and optionally also while the mold is being emptied. This pressure can be exerted pneumatically, hydraulically or even mechanically. In the operating position, the reactive plastics mixture flows from the mixing assembly through the mixing head feeder 6, the cock and the outlet opening 5 into the mold sprue 4. After the measuring or proportioning operation is completed, the cock plug is turned into the flushing position. The turning movement can be effected manually or automatically. In the flushing position, the cleansing medium flows through the mixing assembly and the cock, once again flowing through the mixing head feeder 6 and discharging through the cleaning outlet opening 7. By this means, the cock body and the cock plug are completely cleansed from residual reacting plastics particles. While in the flushing position, the outlet opening 5 is tightly closed by the cock plug. Because of the conically formed outlet opening 5, the molded body, after it has solidified, can be easily removed from the mold with the sprue, which extends up to the cock plug.

By the choice of the material in accordance with the invention for the bushing 2 and the plug 1, a clean sealing of the cock plug relatively to the bushing, on the one hand, and of the outlet from the mold sprue, on the other hand, is guaranteed.

According to the invention, and optionally by means of the applied external bearing pressure P on the cock body, in the region of the outlet opening 5 the sprue is provided with a reduced cross section, which naturally is very beneficial to a separation of the sprue from the sprue bushing in the region of the outlet opening 5 of the bushing 2, after the applied bearing pressure P has been relaxed.

According to one particular embodiment of the invention, the bushing is made of synthetic or natural rubber, polyurethane elastomers, polyolefines, polyamides, polyoxymethylene or polytetrafluorethylene.

The cock plug is advantageously best made of polyamides, polyoxymethylene, polytetrafluorethylene, hard polyurethane elastomers or metal. In the case where the cock plug is made of metal, it has proved to be extremely desirable if the said plug can be heated and is kept at temperatures between 20° and 150° C., but advantageously at temperatures between 60° and 100° C.

It was found in connection with the dimensions of the outlet opening 5 of the bushing 2 that its diameter should either be smaller than or as a maximum equal to the minimum diameter of the mold sprue 4. For the best possible releasing from the mold, it was found that the opening angle of the outlet opening 5 of the bushing 2 towards the mold sprue should be between 0° and 150°, but advantageously between 0° and 20°.

The bushing 2 is advantageously so constructed in the region of the outlet opening 5 that, when there is a bearing pressure P applied and with a given abutment of the surfaces 8 and 9, there is a reduction in cross section in the region of the outlet opening 5 of 0 to 40 percent, but advantageously from 0 to 10 percent.

We claim:

1. In a mold-closure cock assembly, adapted for use in machines for the processing of reactive multicomponent systems, comprising a cock body, for disposition against a mold sprue, having a feed inlet, a feed outlet, and a cleansing outlet; a cock plug disposed in the cock body, which cock plug, in its operative position, connects the feed inlet and feed outlet with said mold sprue and, in its flushing position, connects said feed inlet with said cleansing outlet and seals the feed inlet from the mold sprue; the improvement which comprises an elastic bushing disposed between said cock body and said cock plug and having an inlet opening for alignment with said feed inlet, a cleansing opening aligned with said cleansing outlet, and a mold sprue opening aligned with said mold sprue, wherein the mold sprue opening of the bushing is conically enlarged in the flow direction.

2. Improvement in a mold-closure cock assembly as claimed in claim 8 wherein mold-sprue opening of said bushing adjacent to the mold-sprue forms an opening angle of from 0° to 150° with the mold-sprue.

3. Improvement in a mold-closure cock assembly as claimed in claim 2 wherein the opening angle is from 0° to 20°.

4. Improvement in a mold-closure cock assembly as claimed in claim 1 wherein the largest diameter of the conically enlarged mold-sprue opening of said bushing is no larger than the smallest diameter of the mold-sprue.

5. Improvement in a mold-closure cock assembly as claimed in claim 1 wherein the bushing is made of a material selected from the group consisting of synthetic rubber, natural rubber, polyurethane elastomers, polyolefins, polyamides, polyoxymethylene, and polytetrafluoroethylene.

6. Improvement in a mold-closure cock assembly as claimed in claim 1 wherein the cock plug is made of a material selected from the group consisting of polyamides, polyoxymethylene, polytetrafluoroethylene, polyurethane and metal.

7. Improvement in a mold-closure cock assembly as claimed in claim 1 wherein the portion of said bushing defining the mold-sprue opening therein has an abutment member extending beyond the cock body and for disposition against the mold-sprue, which abutment member, upon application of pressure on the cock body against the mold sprue, is compressed to elastically deform the mold-sprue opening.

8. Improvement in a mold-closure cock assembly as claimed in claim 7 wherein said abutting portions are flanges sealingly extending between said cock body and said mold-sprue.

9. Improvement in a mold-closure cock assembly as claimed in claim 7 wherein application of bearing pressure on the cock body against the mold-sprue reduces the cross-sectionaly area, in the flow direction, of the mold-sprue opening of said bushing by up to 40 percent.

10. Improvement in a mold-closure cock assembly as claimed in claim 9 wherein the cross-sectional area is reduced up to 10 percent.